United States Patent [19]

Biggerstaff

[11] Patent Number: 4,866,978
[45] Date of Patent: Sep. 19, 1989

[54] PIPE INSPECTION METHOD AND DEVICE

[76] Inventor: Bruce A. Biggerstaff, 615 W. Mt. Pleasant Rd., Evansville, Ind. 47711

[21] Appl. No.: 233,249

[22] Filed: Aug. 17, 1988

[51] Int. Cl.$^4$ .......................... G01B 5/12; G01B 5/20
[52] U.S. Cl. ................................ 73/405 R; 73/866.5; 33/178 F; 33/1 N
[58] Field of Search ............. 73/865.8, 40.5 R, 866.5; 33/1 H, 302, 304, 178 F, 544

[56] References Cited

U.S. PATENT DOCUMENTS

| | | | |
|---|---|---|---|
| 2,686,039 | 8/1954 | Bender | 255/1.8 |
| 2,782,370 | 2/1957 | Ver Nooy | |
| 2,953,919 | 9/1960 | Potts | 73/49.5 |
| 3,024,651 | 3/1962 | McGlasson | 73/151 |
| 3,518,873 | 7/1970 | Iglehart et al. | 73/49.5 |
| 3,755,908 | 9/1973 | VerNooy | 33/178 F |
| 3,973,441 | 8/1976 | Porter | 73/432 R |
| 4,000,655 | 1/1977 | Jones | 73/432 R |
| 4,091,678 | 5/1978 | Potter | 73/432 R |
| 4,098,126 | 7/1978 | Howard | 73/432 R |
| 4,170,902 | 10/1979 | Pallan | 73/432 R |
| 4,274,206 | 6/1981 | Moolenaar | 33/178 B |
| 4,354,379 | 10/1982 | Miner | 73/865.8 |
| 4,402,213 | 9/1983 | Hogan | 73/40.5 R |
| 4,702,010 | 10/1987 | Elbracht | 33/178 F |

FOREIGN PATENT DOCUMENTS 1060394 4/1954 France .

OTHER PUBLICATIONS

Recommended Standards for Sewage Works, 1978 Edition, A Report of the Committee of the Great Lakes-Upper Mississippi River Board of State Sanitary Engineers.
Standard Recommended Practice for Underground Installation of Flexible Thermoplastic Sewer Pipe, published by American National Standard-Undated.
Municipal Products and Mechanical Plugs Brochure by Cherne Industries, Inc. dated 1985, for Single-Size Muni-Ball Plugs, cover sheet and p. 7.
The Wortco 9-Arm Deflection Mandrel Brochure by Wortco, Inc.-Undated.

Primary Examiner—Stewart J. Levy
Assistant Examiner—Michele Simons
Attorney, Agent, or Firm—Woodard, Emhardt, Naughton, Moriarty & McNett

[57] ABSTRACT

A method and device for inspecting the internal cross-sectional shape of pipes, and particularly of sewer pipes. A mandrel is inserted into the pipe. The mandrel may include an elastomeric member providing a fluid seal engaging the internal pipe surface. The mandrel also has a retrieval chord attached thereto and trailing therebehind. A plug member is provided behind the mandrel, which may be inflatably expanded to define a second fluid seal with the pipe. The space between the pipe and the two fluid seals is pressurized, such as with compressed air, causing the mandrel to advance along the pipe, pulling the retrieval chord as it advances. The mandrel's advancement will be stopped by a sufficiently large deformation. Thereafter, the mandrel is retrieved by pulling on the retrieval chord.

14 Claims, 4 Drawing Sheets

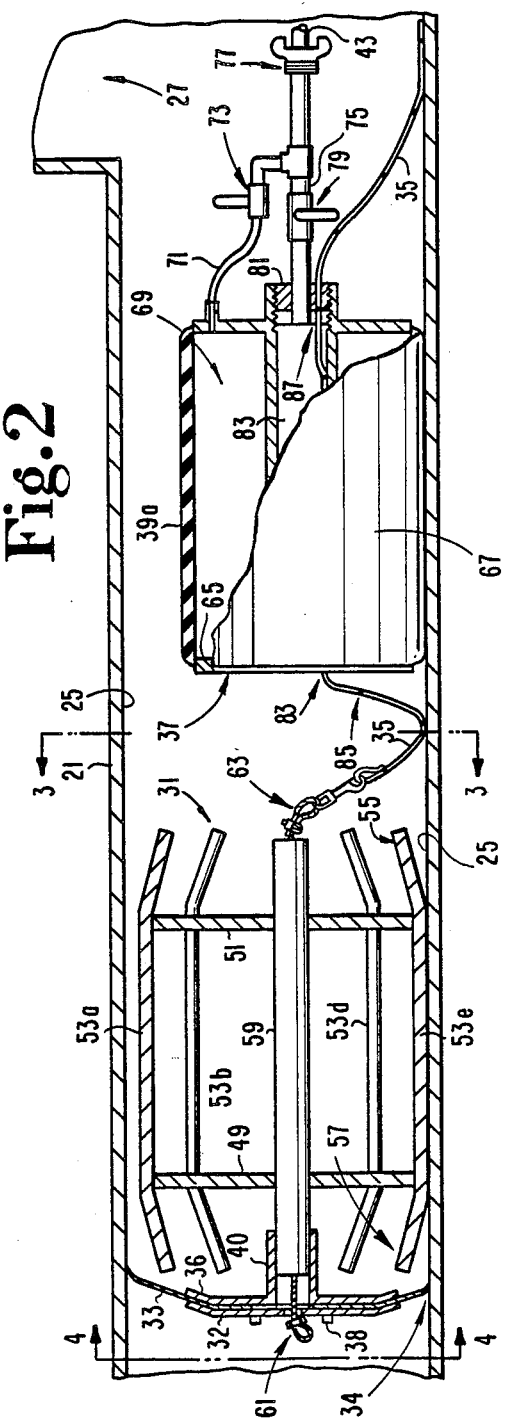

PIPE INSPECTION METHOD AND DEVICE

BACKGROUND OF THE INVENTION

The present invention deals generally with pipe inspection, and more specifically with inspection of the internal cross-sectional shape of pipes.

Sewer pipes placed underground may be partially collapsed or deflected under the weight of soil or other loads. Such pipes, typically having a round cross-sectional shape when not deformed, become unsatisfactory when they are deformed too much. Various government ordinances require inspection of such pipes to ensure deflection does not exceed, for example, 5 percent. This problem of deflection is especially present with certain types of pipes, such as polyvinyl chloride (PVC) pipes, popular for selected applications.

Accordingly, sewer pipes need to be inspected to ensure that they have not unduly deformed or collapsed. Various methods presently exist for conducting such inspections which, in my typical experience, require a crew of four persons to inspect about 3,000 linear feet of sewer pipe per workday. The present invention allows for more than a four fold increase in productivity, requiring only two persons to inspect about 7,000 linear feet of sewer pipe per day.

Prior sewer inspection techniques involve pulling a mandrel by a chord through the pipe to be inspected. However, prior to pulling the mandrel through the sewer pipe, the inspectors have to thread the chord through the pipe ahead of the mandrel. This threading is done in a variety of manners, including directing an electric toy car with a string attached thereto through the pipe, floating a buoyant device with a string attached thereto down the sewer pipe, or blowing a parachute with a line attached thereto down the pipe with an air compressor. After this initial line is thread down the pipe, an operator at the downstream end of the sewer pipe pulls the mandrel through the pipe until a point where a deformation is encountered. These techniques require the labor intensive step of initially threading the line down the sewer pipe before the mandrel can even be run through the inspection. This requires having personnel at both the upstream and downstream ends of the pipe which is being inspected.

U.S. Pat. No. 2,782,370 discloses a device which has two members which both travel down a pipe for detecting electrical current irregularities which evidence potential corrosion leaks.

U.S. Pat. No. 4,354,379 discloses a device for testing the roundness of oil well pipe segments by projecting, under air pressure, a free floating drift through the pipe. U.S. Pat. No. 4,354,379 alternatively discloses the conventional approach discussed above of pulling the drift through the pipe using a cable in front of the drift.

The present invention provides a unique combination particularly well-suited for inspecting underground pipes such as sewers. The present inventive method may be conducted either from the upstream end of the pipe to be inspected or from the downstream end. The inventive method is rapid and efficient compared to prior methods. Particularly, a specially adapted mandrel is inserted into the pipe. The mandrel has a retrieval chord attached to it which trails behind the mandrel and which is preferably wound up on a reel. A plug member is fixed in the pipe behind the mandrel. A pressurized fluid, such as compressed air, is then forced in the space between the plug and the mandrel, propelling the mandrel along the pipe away from the plug. The mandrel is advanced as much as five hundred or more feet, trailing the retrieval chord behind it as it advances. After the mandrel has advanced the full length of the pipe to be inspected without stopping at a deformation, the mandrel is removed at the next manhole. If the mandrel stops before reaching the next manhole at a sufficiently small deformation in the pipe, the pressure is turned off and the mandrel is retrieved by pulling on the retrieval chord. As stated above, this technique may provide as much as a four fold increase in productivity, and is a significant advance in the art.

SUMMARY OF THE INVENTION

According to one embodiment, the present invention provides a method for inspecting the internal cross-sectional shape of pipes comprising the steps of inserting a mandrel into a pipe having an internal pipe surface, the mandrel having first means for providing a fluid seal engaging the internal pipe surface, the mandrel having a retrieval cord attached thereto and trailing behind the mandrel; fixing a plug member in the pipe behind the mandrel, the plug member having second means for providing a fluid seal with the pipe, wherein the first means for providing a fluid seal, the second means for providing a fluid seal and the internal pipe surface collectively define a pressuring space therebetween; and propelling the mandrel along the pipe away from the plug member by pressurizing the pressurizing space with a fluid, wherein the retrieval cord trails behind the mandrel during the propelling step.

According to another embodiment, the present invention also provides a device for inspecting the internal cross-sectional shape of pipes comprising a mandrel adapted to be inserted into a pipe having an internal pipe surface, the mandrel having first means for providing a fluid seal engaging the internal pipe surface; a retrieval cord attached to the mandrel and adapted to trail behind the mandrel; a plug member adapted to be fixed in the pipe behind the mandrel, the plug member having second means for providing a fluid seal with the pipe, wherein the first means for providing a fluid seal, the second means for providing a fluid seal and the internal pipe surface collectively define a pressuring space therebetween; and means for pressurizing the pressurizing space, wherein the mandrel is propellable along the pipe away from the plug member with the first means for providing a fluid seal being freely movable along the internal pipe surface upon pressuring the pressuring space, and wherein the retrieval cord trails behind the mandrel between the mandrel and the plug member.

The present invention also provides a mandrel for use in inspecting the internal cross-sectional shape of pipes comprising a forward radial support member having a first circumference; a rearward radial support member having a second circumference; a plurality of arms rigidly connected to the forward radial support member and to the rearward radial support member, the arms being disposed around the first circumference and around the second circumference, wherein the arms run longitudinally between the forward and rearward support members, and wherein the arms are bent radially inward at a front end near the forward radial support member, and wherein the arms are bent radially inward at a rear end near the rearward radial support member; and an elastomeric diaphragm fixed with respect to the arms and having a circular profile for forming a fluid seal along the internal surface of the pipe to be inspected.

An object of the present invention is to provide an improved pipe inspection method and device.

Related objects and advantages of the present invention are disclosed in the following description of the preferred embodiment.

BRIEF DESCRIPTION OF THE DRAWINGS

FIG. 2 is a side, partial cutaway, detail view of the device of the present invention;

DESCRIPTION OF THE PREFERRED EMBODIMENT

Figure 1:
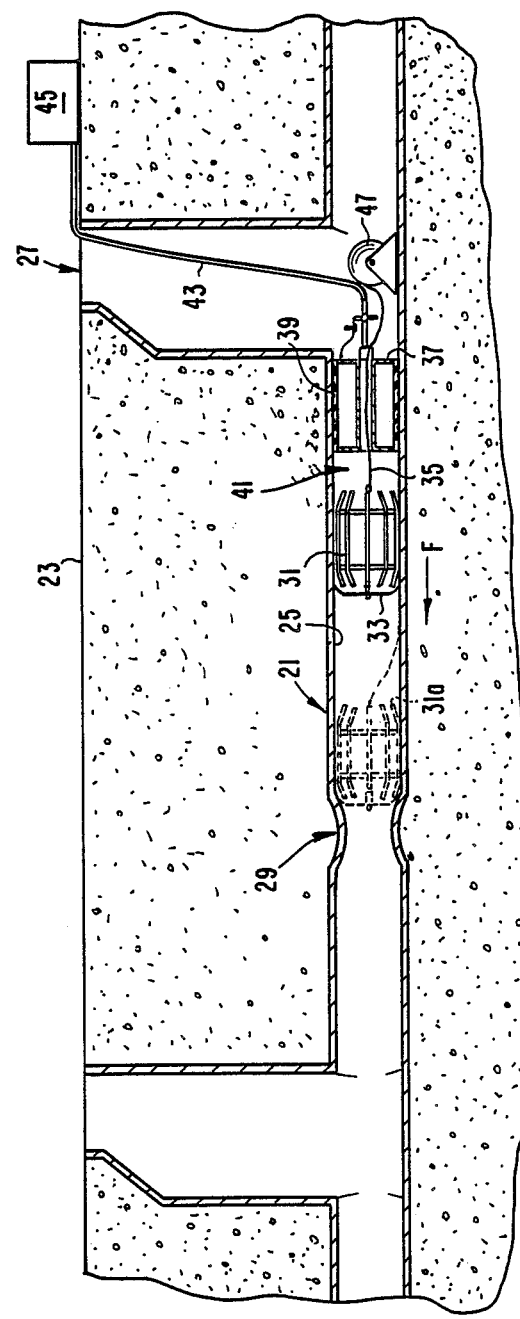
FIG. 1 is a side, partial sectional view of the device of the present invention shown in a cutaway sewer pipe.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

Referring to FIGS. 1–4, the device of the present invention is shown in sewer pipe 21. Sewer pipe 21 is located beneath ground surface 23 and has an internal pipe surface 25. Typically, pipe 21 and internal pipe surface 25 are circular in cross-section when not deformed. Sewer pipe 21 is located in and accessed by sewer manholes, such as sewer manhole 27. As previously discussed, deformations in pipe 21, such as cross-sectional deformation 29, may occur due to soil loading or other stresses. Typically, deformation 29 results in a loss of circularity, and may cause the internal cross-section to take on an oblong or oval shape.

Mandrel 31 includes an elastomeric diaphragm 33 typically made of flexible plastic, rubber or a similar compound. In the preferred embodiment, elastomeric diaphragm has a circular profile (see FIGS. 3 and 4) to correspond with the profile of the internal surface of the pipe to be inspected. Diaphragm 33 forms a mandrel fluid seal, such as seal 34, with internal pipe surface 25. This seal is sufficiently tight to prevent a significant flow of pressurized fluid, such as compressed air, from crossing the seal, and yet is not so tight as to significantly inhibit movement of diaphragm 33 and seal 34 across internal pipe surface 25. Diaphragm 33 is preferably attached to the rest of mandrel 31 at connection 61 in the axial center of the mandrel.

Mandrel 31 has retrieval chord 35 attached thereto at connection 63. Retrieval chord 35 trails along behind mandrel 31 and is pulled thereby.

Plug member 37 is located behind mandrel 31 and, as illustrated in FIG. 1, is fixed in place along the internal pipe surface 25 of pipe 21. Such fixation is preferably defined by plug fluid seal 39 forming a fluid tight friction fit between plug member 37 and internal pipe surface 25. A pressurizing space 41 is defined between mandrel fluid seal 34, plug fluid seal 39, and internal pipe surface 25. Pressurizing space 41 is pressurized with fluid, such as compressed air, to propel mandrel 31 along the length of the pipe for inspection. Compressed air is supplied by common pressure line 43 which in turn is connected to a pressurized fluid source such as air compressor 45.

Preferably, retrieval chord 35 passes through plug member 37 and is reeled and unreeled upon retrieval chord reel 47 (see FIG. 1). As pressurizing space 41 is filled with compressed air, mandrel 31 advances forwardly in the direction "F". Mandrel 31 continues to advance until it reaches cross-sectional deformation 29 at which location its progress is blocked as shown as mandrel 31a in phantom lines. During such advancement, retrieval chord is pulled along behind the mandrel, unreeling from reel 47.

Figure 4:
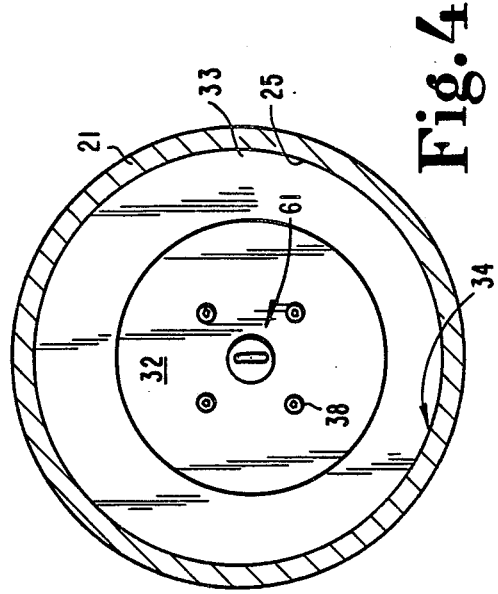
FIG. 4 is a front view of the mandrel of the present invention taken from the perspective of line 4—4 in FIG. 2.
Figure 3:
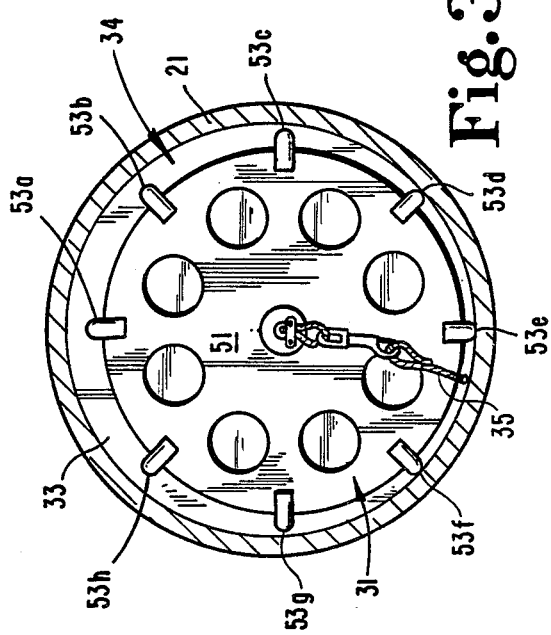
FIG. 3 is a rear view of the mandrel of the present invention taken from the perspective of line 3—3 in FIG. 2.

Referring more specifically to FIGS. 2–4, mandrel 31 may comprise a modified version of a type of mandrel offered by Wortco, Inc. of Franklin, Ohio. Such mandrel includes the forward radial support member 49, a rearward radial support member 51, and a plurality of arms, 53a, 53b, 53c, 53d, 53e, 53f, 53g, and 53h disposed around the circumference of support member 49 and the circumference of support member 51. Preferably, there are at least eight such arms which run longitudinally. Each of such arms has a rear end, such as rear end 55, which is bent radially inward. Similarly, each of such arms has a front end, such as front end 57, which is also bent radially inward. Furthermore, axial core 59 is provided between support members 49 and 51 and along the axial center of mandrel 31. The mandrel has elastomeric diaphragm 33 coupled thereto at connection 61. As illustrated, elastomeric diaphragm 33 is shown in the forwardmost position, in front of the arms, but optionally may be provided at other locations. Accordingly, mandrel 31, as illustrated, forms a rigid cage with an elastomeric diaphragm thereon. The cage is preferably made of rigid plastic, steel or a similar such rigid material.

Figure 5:
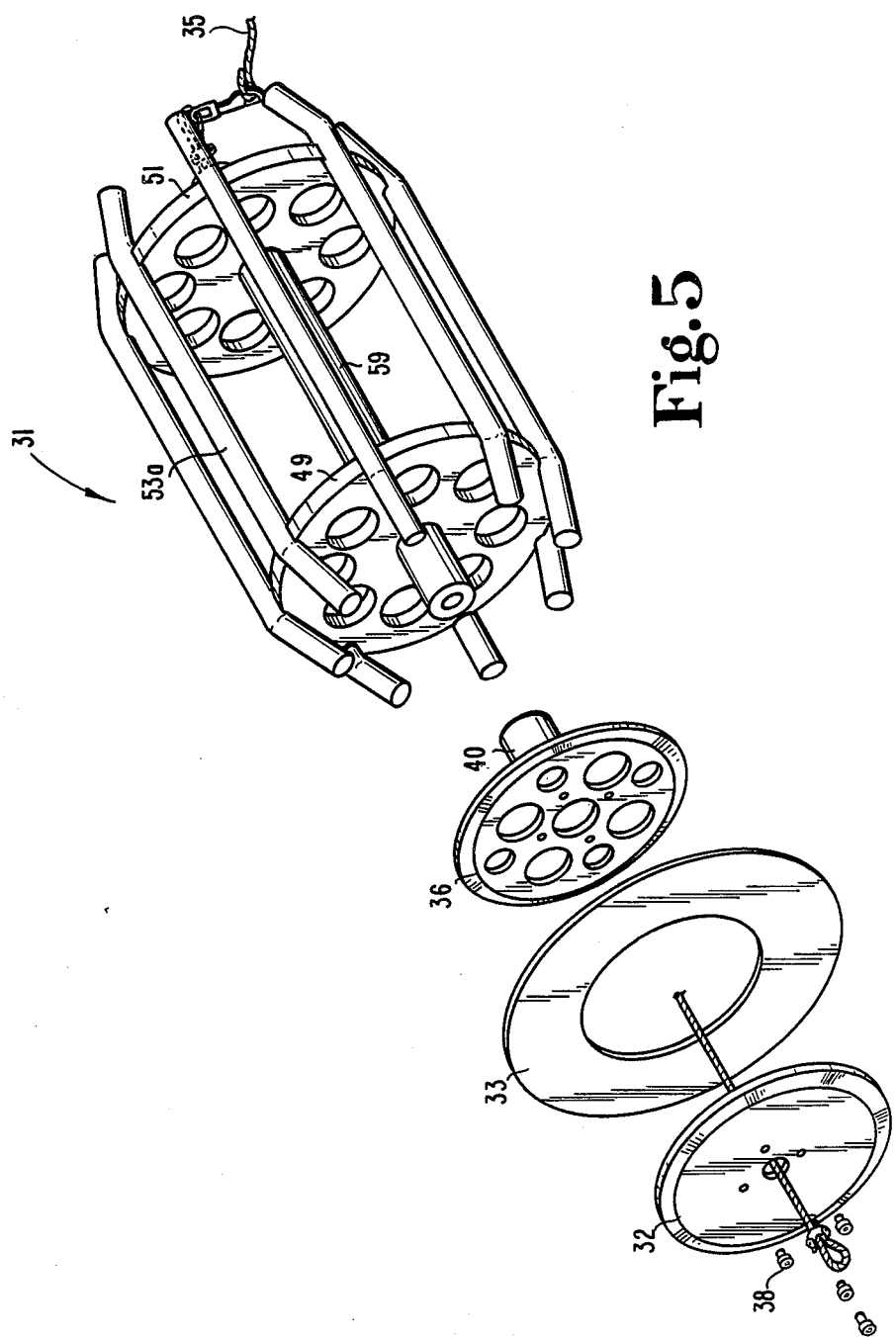
FIG. 5 is an exploded front perspective view of the mandrel of the present invention.

Referring particularly to FIGS. 2 and 5, mandrel 31 is shown with its elastomeric diaphragm assembly. Elastomeric diaphragm 33 is affixed to the remainder of mandrel 31 by screws, such as screw 38, holding front plate 32 together with back plate 36 with diaphragm 33 sandwiched therebetween. Back plate 36 has sheath 40 which is affixed around axial core 59. A variety of other diaphragm assemblies are possible while being within the scope of the present invention.

FIG. 2 illustrates plug member 37 in a deflated, or unexpanded state. This is in contrast to FIG. 1 which illustrates plug member 37 inflated and expanded, forming plug fluid seal 39. FIG. 2 illustrates plug member 37 partially cutaway having plug frame 65 covered by flexible plug cover 67. Plug frame 65 is typically formed of metal, whereas flexible plug cover 67 is formed of a flexible, elastomeric substance to allow expansion. Inflation, and accordingly, expansion, is provided by pressurizing inflatable expanding vessel 69 defined in the annular space between plug frame 65 and flexible plug cover 67. By so doing, vessel 69 expands, causing the plug to expand around its circumference, such as at 39a, until it engages internal pipe surface 25, forming plug fluid seal 39. Plug member 37 is a modified version of a plug offered by Cherne Industries, Inc. In particular, adapted fitting 81 is provided, which includes chord hole 87 longitudinally therethrough. Fitting 81 has a threaded external surface to be threaded into the female threads provided on plug frame 65. Chord hole 87 allows chord 35 to run from central opening 83 through fitting 81 to a location behind plug member 37. Adapted fitting 81 also includes pressure line branch 75 attached thereto for providing compressed air through central opening 83 into pressurizing space 41. Central opening 83 is preferably along a longitudinally central axis of plug member 37.

Compressed air for inflating inflatable expanding vessel 69 is provided through pressure line branch 71 which is valved by valve 73. Preferably, valve pressure line branch 71 is a quarter inch air line and valve 73 is a quarter inch valve. Similarly, a separate pressure line branch 75 is provided (preferably a three quarter inch galvanized pipe) having a valve 79 (preferably a three quarter inch valve) therein. Each of these branches is preferably supplied with compressed air from common pressure line 43 which is attached thereto by pressure line adaptor fitting 77. In this way, independent control of presurizing inflatable expanding vessel 69 or pressurizing space 41 may be achieved while only requiring a single, common pressure line 43.

Retrieval chord 35 may be provided with distance markings, such as distance marking 85. Such markings enable the operator to measure the distance along the pipe which mandrel 31 has traveled, and accordingly, gauge the approximate location of a deformation, such as deformation 29.

The method of utilizing the device for the present invention is as follows. First, mandrel 31 and plug member 37 are typically lowered into a manhole to access the sewer pipe. Mandrel 31 is inserted into pipe 21 with elastomeric diaphragm 33 providing a fluid seal engaging internal pipe surface 25. Retrieval chord 35 is attached to mandrel 31 and trails behind the mandrel. Next, plug member 37 is inserted into pipe 21 and fixed in place. Such fixing may be accomplished by inflating inflatable expanding vessel 69 by providing pressurized air therein. Such expanding causes plug fluid seal 39 to be defined between plug member 37 and internal pipe surface 25. Next, mandrel 31 is propelled along the pipe away from plug member 37 by pressurizing the pressurizing space 41. Such pressurizing of space 41 is accomplished by opening valve 79, allowing compressed air from air compressor 45 to flow into space 41. Accordingly, mandrel 31 is propelled under pressure forwardly in the direction "F", as illustrated in FIG. 1. Such forward propulsion moves the mandrel along as pressure is maintained until either the mandrel encounters a deformation, such as deformation 29, or until the chord 35 runs out of length. If a deformation is encountered, the operator may note the location of the deformation by checking distance markings. Thereafter, pressure in pressurizing space 41 is turned off and mandrel 31 is retrieved by pulling on retrieval chord 35 back towards plug member 37. As can be understood from the previous description, this method may be conducted from a singular location at sewer manhole 27. If the mandrel advances the full length of the pipe, the mandrel is removed at the next manhole.

A collateral benefit which may be realized from utilization of the present invention is that ruptures or other leaks in sewer line 21 may be detected. More specifically, as mandrel 31 advances along the pipe, if mandrel fluid seal 34 passes across a rupture or hole in pipe 21, it may be difficult to maintain pressure in space 41. If a sudden pressure loss is experienced, the operator may determine that a rupture or hole is present. By noting the distance which chord 35 has been advanced into the pipe, the operator may determine the location of the hole.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for inspecting the internal cross-sectional shape of pipes comprising the steps of:
    inserting a mandrel into a sewer pipe having an internal pipe surface, said mandrel having first means for providing a fluid seal engaging the internal pipe surface, said mandrel having a retrieval cord attached thereto and trailing behind said mandrel, wherein said mandrel includes a plurality of circumferentially disposed arm members and an elastomeric diaphragm forming said first means for providing a fluid seal;
    fixing in a sewer pipe a plug member in the pipe behind said mandrel, said plug member having second means for providing a fluid seal with the pipe, wherein said first means for providing a fluid seal, said second means for providing a fluid seal and the internal pipe surface collectively define a pressuring space therebetween; and
    propelling said mandrel along the pipe by pressurizing said pressurizing space with a fluid, wherein said retrieval cord trails behind said mandrel during said propelling step.

2. The method of claim 1 wherein said inserting step and said fixing step occur in a sewer pipe located in a sewer manhole.

3. The method of claim 2 and further comprising the step of retrieving said mandrel from within the pipe by pulling on said retrieval cord toward said plug member, said retrieving step occurring after said propelling step.

4. A method for inspecting the internal cross-sectional shape of pipes comprising the steps of:
    inserting a mandrel into a pipe having an internal pipe surface, said mandrel having first means for providing a fluid seal engaging the internal pipe surface, said mandrel having a retrieval cord attached thereto and trailing behind said mandrel;
    fixing a plug member in the pipe behind said mandrel, said plug member having second means for providing a fluid seal with the pipe, wherein said first means for providing a fluid seal, said second means for providing a fluid seal and the internal pipe surface collectively define a pressuring space therebetween;
    propelling said mandrel along the pipe away from said plug member by pressurizing said pressurizing space with a fluid, wherein said retrieval cord trails behind said mandrel during said propelling step;
    wherein said inserting step and said fixing step occur in a sewer pipe located in a sewer manhole;
    retrieving said mandrel from within the pipe by pulling on said retrieval cord toward said plug member, said retrieving step occurring after said propelling step; and wherein said fixing step includes the step of inflating an inflatable expanding vessel within the pipe forming said second means for providing a fluid seal.

5. The method of claim 4 wherein said plug member has a central opening therein located along a control axis of said plug member, and wherein said propelling step includes the step of forcing compressed air through said central opening, wherein said mandrel comprises a rigid cage with an elastomeric diaphragm thereon forming said first means for providing a fluid seal, and wherein said retrieval cord feeds through said central opening in said plug member as said mandrel is propelled away from said plug member.

6. The method of claim 1 and further comprising the step of retrieving said mandrel from within the pipe by pulling on said retrieval cord toward said plug member, said retrieving step occurring after said propelling step.

7. A method for inspecting the internal cross-sectional shape of pipes comprising the steps of:
inserting a mandrel into a pipe having an internal pipe surface, said mandrel having first means for providing a fluid seal engaging the internal pipe surface, said mandrel having a retrieval cord attached thereto and trailing behind said mandrel;
fixing a plug member in the pipe behind said mandrel, said plug member having second means for providing a fluid seal with the pipe, wherein said first means for providing a fluid seal, said second means for providing a fluid seal and the internal pipe surface collectively define a pressuring space therebetween;
propelling said mandrel along the pipe by pressurizing said pressurizing space with a fluid, wherein said retrieval cord trails behind said mandrel during said propelling step; and
wherein said fixing step includes the step of inflating an inflatable expanding vessel within the pipe forming said second means for providing a fluid seal.

8. The method of claim 1 wherein said plug member has a central opening therein located along a central axis of said plug member, and wherein said propelling step includes the step of forcing compressed air through said central opening, wherein said mandrel comprises a rigid cage with an elastomeric diaphragm thereon forming said first means for providing a fluid seal, and wherein said retrieval cord feeds through said central opening in said plug member as said mandrel is propelled away from said plug member.

9. A method for inspecting the internal cross-sectional shape of pipes comprising the steps of:
inserting a mandrel into a pipe having an internal pipe surface, said mandrel having first means for providing a fluid seal engaging the internal pipe surface, said mandrel having a retrieval cord attached thereto and trailing behind said mandrel;
fixing a plug member in the pipe behind said mandrel, said plug member having second means for providing a fluid seal with the pipe, wherein said first means for providing a fluid seal, said second means for providing a fluid seal and the internal pipe surface collectively define a pressuring space therebetween;
propelling said mandrel along the pipe away from said plug member by pressurizing said pressurizing space with a fluid, wherein said retrieval cord trails behind said mandrel during said propelling step;
retrieving said mandrel from within the pipe by pulling on said retrieval cord toward said plug member, said retrieving step occurring after said propelling step; and
wherein said fixing step includes the step of inflating an inflatable expanding vessel within the pipe forming said second means for providing a fluid seal.

10. A device for inspecting the internal cross-sectional shape of pipes comprising:
a mandrel adapted to be inserted into a sewer pipe having an internal pipe surface, said mandrel having first means for providing a fluid seal engaging the internal pipe surface, wherein said mandrel includes a plurality of circumferentially disposed arm members and an elastomeric diaphragm forming said first means for providing a fluid seal;
a retrieval cord attached to said mandrel and adapted to trail behind said mandrel;
a plug member adapted to be fixed in the sewer pipe behind said mandrel, said plug member having second means for providing a fluid seal with the pipe, wherein said first means for providing a fluid seal, said second means for providing a fluid seal and the internal pipe surface collectively define a pressuring space therebetween; and
means for pressurizing said pressurizing space, wherein said mandrel is propellable along the pipe away from said plug member with said first means for providing a fluid seal being freely movable along the internal pipe surface upon pressuring said pressurizing space, and wherein said retrieval cord trails behind said mandrel between said mandrel and said plug member.

11. A device for inspecting the internal cross-sectional shape of pipes comprising:
a mandrel adapted to be inserted into a pipe having an internal pipe surface, said mandrel having first means for providing a fluid seal engaging the internal pipe surface;
a retrieval cord attached to said mandrel and adapted to trail behind said mandrel;
a plug member adapted to be fixed in the pipe behind said mandrel, said plug member having second means for providing a fluid seal with the pipe, wherein said first means for providing a fluid seal, said second means for providing a fluid seal and the internal pipe surface collectively define a pressuring space therebetween;
means for pressurizing said pressurizing space, wherein said mandrel is propellable along the pipe away from said plug member with said first means for providing a fluid seal being freely movable along the internal pipe surface upon pressuring said pressurizing space, and wherein said retrieval cord trails behind said mandrel between said mandrel and said plug member; and
wherein said means for pressuring comprises an air compressor, and wherein said plug member includes an inflatable expanding vessel for inflation within the pipe forming said second means for providing a fluid seal.

12. A device for inspecting the internal cross-sectional shape of pipes comprising:
a mandrel adapted to be inserted into a pipe having an internal pipe surface, said mandrel having first means for providing a fluid seal engaging the internal pipe surface;
a retrieval cord attached to said mandrel and adapted to trail behind said mandrel;

a plug member adapted to be fixed in the pipe behind said mandrel, said plug member having second means for providing a fluid seal with the pipe, wherein said first means for providing a fluid seal, said second means for providing a fluid seal and the internal pipe surface collectively define a pressuring space therebetween;

means for pressurizing said pressurizing space, wherein said mandrel is propellable along the pipe away from said plug member with said first means for providing a fluid seal being freely movable along the internal pipe surface upon pressuring said pressurizing space, and wherein said retrieval cord trails behind said mandrel between said mandrel and said plug member;

wherein said means for pressuring comprises an air compressor, and wherein said plug member includes an inflatable expanding vessel for inflation within the pipe forming said second means for providing a fluid seal; and wherein said air compressor is coupled to said pressurizing space and to said inflatable expanding vessel by a common pressure line, said pressure line having a first valved branch coupled to said pressuring space and further having a second valved branch coupled to said inflatable expanding vessel.

13. The device of claim 12 wherein said mandrel comprises a rigid cage with an elastomeric diaphragm thereon forming said first means for providing a fluid seal.

14. A device for inspecting the internal cross-sectional shape of pipes comprising:

a mandrel adapted to be inserted into a pipe having an internal pipe surface, said mandrel having first means for providing a fluid seal engaging the internal pipe surface;

a retrieval cord attached to said mandrel and adapted to trail behind said mandrel;

a plug member adapted to be fixed in the pipe behind said mandrel, said plug member having second means for providing a fluid seal with the pipe, wherein said first means for providing a fluid seal, said second means for providing a fluid seal and the internal pipe surface collectively define a pressuring space therebetween;

means for pressurizing said pressurizing space, wherein said mandrel is propellable along the pipe with said first means for providing a fluid seal being freely movable along the internal pipe surface upon pressuring said pressuring space, and wherein said retrieval cord trails behind said mandrel between said mandrel and said plug member; and wherein said mandrel comprises a rigid cage with an elastomeric diaphragm thereon forming said first means for providing a fluid seal.

* * * * *

UNITED STATES PATENT AND TRADEMARK OFFICE
CERTIFICATE OF CORRECTION

PATENT NO.  : 4,866,978

DATED       : September 19, 1989

INVENTOR(S) : Bruce A. Biggerstaff

It is certified that error appears in the above-identified patent and that said Letters Patent is hereby corrected as shown below:

At column 7, line 5, the word "control" should read --central--.

Signed and Sealed this

Fourteenth Day of August, 1990

Attest:

HARRY F. MANBECK, JR.

*Attesting Officer*      *Commissioner of Patents and Trademarks*